United States Patent
Gopalan et al.

(10) Patent No.: US 7,898,417 B2
(45) Date of Patent: Mar. 1, 2011

(54) STANDARDIZED MECHANISM FOR PRINTING LABELS AND MANAGING TEMPLATES WITHIN RFID

(75) Inventors: Krishnan Gopalan, Hyderabad (IN); Abhishek Agarwal, Hyderabad (IN); Jayaraman Kalyana Sundaram, Hyderabad (IN); Bhuvanesh N. Jain, Tamil Nadu (IN)

(73) Assignee: Microsoft Corporation, Redmond, WA (US)

( * ) Notice: Subject to any disclaimer, the term of this patent is extended or adjusted under 35 U.S.C. 154(b) by 1009 days.

(21) Appl. No.: 11/690,958

(22) Filed: Mar. 26, 2007

(65) Prior Publication Data

US 2008/0238673 A1    Oct. 2, 2008

(51) Int. Cl.
*G08B 13/14* (2006.01)
(52) U.S. Cl. ............ 340/572.1; 340/572.3; 340/572.4; 340/572.7; 340/572.8; 340/10.1; 235/375; 235/383; 235/385; 235/432; 235/451; 235/487
(58) Field of Classification Search ............ 340/572.1, 340/572.3, 572.4, 572.7, 572.8, 10.1; 235/375, 235/383, 385, 432, 451, 462.01, 487; 385/1.13, 385/1.15
See application file for complete search history.

(56) References Cited

U.S. PATENT DOCUMENTS

| | | | |
|---|---|---|---|
| 6,078,251 A | 6/2000 | Landt et al. | |
| 6,246,326 B1 | 6/2001 | Wiklof et al. | |
| 6,908,034 B2 | 6/2005 | Alleshouse | |
| 7,114,654 B2 | 10/2006 | Chapman et al. | |
| 7,273,165 B2 * | 9/2007 | Satake et al. | 235/375 |
| 2006/0060657 A1 | 3/2006 | Choong et al. | |
| 2006/0131377 A1 * | 6/2006 | Zimmerman | 235/375 |
| 2006/0227365 A1 * | 10/2006 | Hohensee et al. | 358/1.15 |
| 2006/0227366 A1 | 10/2006 | Hohensee et al. | |
| 2006/0249566 A1 | 11/2006 | Alleshouse | |
| 2006/0282330 A1 | 12/2006 | Frank et al. | |

OTHER PUBLICATIONS

Microsoft. "New VizTalk RFID Functionality Delivers Advanced RFID Device and Data Management Along with Unprecedented Partner Support" http://www.microsoft.com/presspass/press/2006/jun06/06-06EtBusinessProcessPR.mspx last viewed Feb. 5, 2007, 3 pages.
ATC-Advanced Technologies Center. "SS2 RFID Project Report" Apr. 19, 2005, 50 pages.
Salminen, et al. "Enhancing Bluetooth Connectivity with RFID" (2006) IEEE, 6 pages.

* cited by examiner

*Primary Examiner*—Tai T Nguyen
(74) *Attorney, Agent, or Firm*—Turocy & Watson, LLP

(57) ABSTRACT

The claimed subject matter provides a system and/or a method that facilitates utilizing an RFID printer within a radio frequency identification (RFID) network. A radio frequency identification (RFID) network can include at least one RFID printer. A standardized print component can abstract a model-specific implementation of the RFID printer to enable uniform and standard exposure of a printing feature of the RFID printer independent of the RFID printer model.

18 Claims, 15 Drawing Sheets

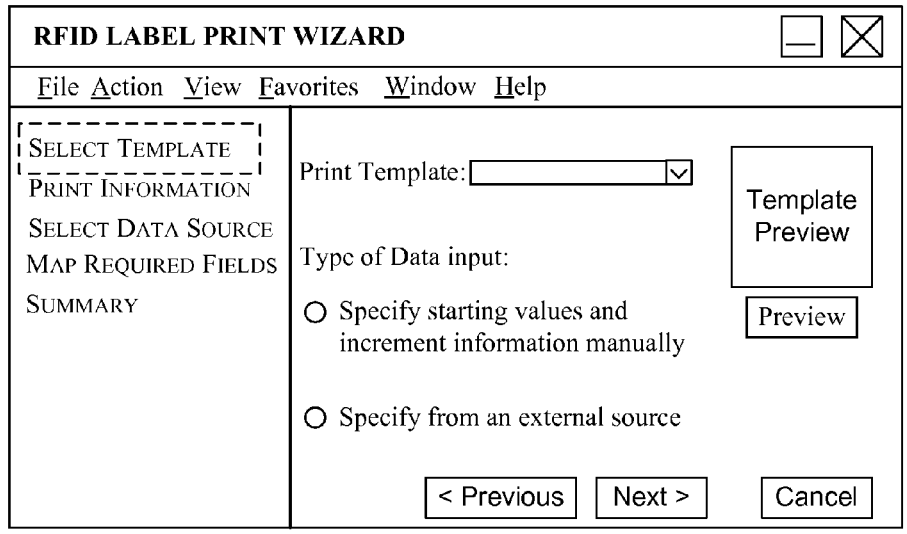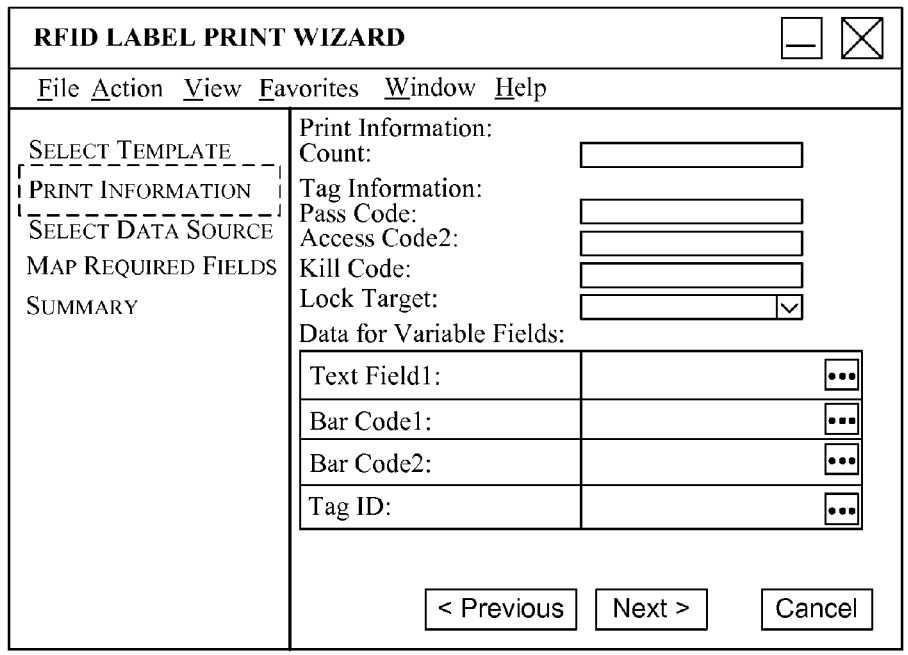
FIG. 7

800

RFID LABEL PRINT WIZARD

File  Action  View  Favorites  Window  Help

SELECT TEMPLATE
PRINT INFORMATION
SELECT DATA SOURCE
MAP REQUIRED FIELDS
SUMMARY

Select Data Source:
Select the type of data to be used for the connection:

Data type Source: [dropdown]

Use Data File:

File Name: [_____] [Browse]

[< Previous] [Next >] [Cancel]

802

RFID LABEL PRINT WIZARD

File  Action  View  Favorites  Window  Help

SELECT TEMPLATE
PRINT INFORMATION
SELECT DATA SOURCE
MAP REQUIRED FIELDS
SUMMARY

Map required fields:
Tag Information:
Pass Code: [_____]
Access Code: [_____]
Kill Code: [_____]
Lock Target: [dropdown]
Map Fields:
Map the required fields with those given in the data source.

| Text Field1: | | ... |
| Bar Code1: | | ... |
| Bar Code2: | | ... |
| Tag ID: | | ... |

[< Previous] [Next >] [Cancel]

RFID LABEL PRINT WIZARD

File  Action  View  Favorites  Window  Help

INTRODUCTION
SELECT TEMPLATE
PRINT INFORMATION
SELECT DATA SOURCE
MAP REQUIRED FIELDS
SUMMARY

Select the type of data input that you wish to use for printing and click next to continue.

Type of Data input:

◉ Specify starting values and increment information manually

◯ Specify from an external source

[ < Previous ]  [ Next > ]  [ Cancel ]

1102

RFID LABEL PRINT WIZARD

File  Action  View  Favorites  Window  Help

INTRODUCTION
SELECT TEMPLATE
PRINT INFORMATION
SELECT DATA SOURCE
MAP REQUIRED FIELDS
SUMMARY

Select the template to use for printing labels.

Template:  [ template01 ▾ ]  Preview of template is not supported.

[ < Previous ]  [ Next > ]  [ Cancel ]

RFID LABEL PRINT WIZARD                                   ☐ ☒

File  Action  View  Favorites  Window  Help

| INTRODUCTION | Select Data Source: |
| SELECT TEMPLATE | Select the type of data to be used for the connection: |
| PRINT INFORMATION | Data type Source: [ ▼ ] |
| SELECT DATA SOURCE | Use Data File: |
| MAP REQUIRED FIELDS | File Name: [ ] [Browse] |
| SUMMARY | Sheet: [ ] [Browse] |
|  | [< Previous] [Next >] [Cancel] |

← 1202

RFID LABEL PRINT WIZARD                                   ☐ ☒

File  Action  View  Favorites  Window  Help

INTRODUCTION

SELECT TEMPLATE

PRINT INFORMATION

SELECT DATA SOURCE

MAP REQUIRED FIELDS

SUMMARY

Enter the number of labels to be printed, the optional codes to be encoded in the tag and the data for the variable fields in the template.

Count: [1]
Pass Code: [••]
Access Code: [••]
Confirm Access Code: [••]
Kill Code: [••]
Confirm Kill Code: [••]
Lock Targets: [Both ▼]

Input for variable fields in the printer template.
Variable Fields

| barcode11 | |
| Field22 | |
| TagIdentifier | ab |
| TagIdentifier:Rfid desc1 | |

[< Previous] [Next >] [Cancel]

RFID LABEL PRINT WIZARD

File  Action  View  Favorites  Window  Help

| INTRODUCTION | Map Required Fields |
| SELECT TEMPLATE | |
| PRINT INFORMATION | Pass Code:         [••] |
| SELECT DATA SOURCE | Access Code:       [••] |
| MAP REQUIRED FIELDS | Confirm Access Code: [••] |
| SUMMARY | Kill Code:         [••] |
|  | Confirm Kill Code: [••] |
|  | Lock Targets:      [Both ▼] |

Map the required variable fields with those given in the data source.

Variable Fields

| barcode11 | Field 1 |
|---|---|
| Field22 | Field2 |
| TagIdentifier | Tag ID ▼ |
| TagIdentifier:Rfid desc1 | |

[< Previous]  [Next >]  [Cancel]

← 1302

RFID LABEL PRINT WIZARD

File  Action  View  Favorites  Window  Help

| INTRODUCTION | The status of the print request is displayed below. |
| SELECT TEMPLATE | Label Status: |
| PRINT INFORMATION | |
| SELECT DATA SOURCE | |
| MAP REQUIRED FIELDS | |
| SUMMARY | |

| Tag ID | Status |
|---|---|
| 11 | Success |
| 12 | Success |
| 13 | Success |
| 14 | Success |
| 15 | Success |
| 16 | Success |
| 17 | Success |

Total Labels issued: 7        Notification received: 7

FIG. 13

STANDARDIZED MECHANISM FOR PRINTING LABELS AND MANAGING TEMPLATES WITHIN RFID

BACKGROUND

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g. more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g. distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g. tag transceivers), tag writers, tag-programming stations, circulation readers, sorting equipment, tag inventory wands, printers, etc. Moreover, various makes, models, and/or types can be associated with respective components (e.g. tag, devices, RFID devices, printers, RFID printers, print formats, tag readers, tag programming stations, circulation readers, sorting equipment, tag inventory wands, etc.). In particular, each RFID compatible printer can include device-specific configurations, settings, formats, data requirements, software, etc. respective to a vendor, wherein the deployment of each RFID compatible printer can prove overwhelming to comprehend and/or implement. For instance, an RFID printer from vendor A can include a mechanism for printing an RFID label, whereas an RFID printer from vendor B can include a disparate mechanism for printing the same RFID label. In other words, each vendor and/or RFID printer can include a proprietary mechanism to print within an RFID architecture. Thus, utilizing a variety of RFID printers from a plurality of vendors (each with various characteristics associated therewith) can be an increasingly difficult task based on such diversity and respective proprietary mechanisms for printing.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate standardizing a uniform manner to implement at least one RFID printer feature independent of the RFID printer model. A standardized print component can generate an object model corresponding to a particular radio frequency identification (RFID) printer within an RFID network and expose at least one print feature respective to the RFID printer utilizing the object model. Specifically, the object model can be abstracted as a model-specific implementation of the RFID printer and enable exposure of a print feature in a standard manner. By employing the standardized print component, a plurality of disparate RFID printers can be utilized universally in a seamless manner to provide a print feature.

In accordance with an aspect of the claimed subject matter, the standardized print component can include an evaluator component that can identify a portion of identification data respective to an RFID printer. Based on the portion of identification data for the RFID printer, a model component can create an object model to abstract the RFID printer to utilize the RFID printer in a standardized manner. By evaluating the various disparate RFID printers within the RFID network, the model component can allow the RFID printers to be abstracted with the object model to allow universal exposure of the various print features independent of the RFID printer model, make, type, brand, vendor, functionality, etc. In other aspects of the claimed subject matter, methods are provided that facilitate evaluating at least one RFID printer within an RFID network to employ a standardized and uniform technique for printing.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 7 illustrates a block diagram of exemplary user interfaces that facilitate generating a standardized print template for an RFID printer in accordance with the subject innovation.

FIG. 8 illustrates a block diagram of exemplary user interfaces that facilitate specifying data to enable a standardized print template for an RFID printer in accordance with the subject innovation.

FIG. 11 illustrates a block diagram of exemplary user interfaces that facilitate generating a standardized print template for an RFID printer in accordance with the subject innovation.

FIG. 12 illustrates a block diagram of exemplary user interfaces that facilitate generating a standardized print template for an RFID printer in accordance with the subject innovation.

FIG. 13 illustrates a block diagram of exemplary user interfaces that facilitate generating a standardized print template for an RFID printer in accordance with the subject innovation.

DETAILED DESCRIPTION

Figure 1:
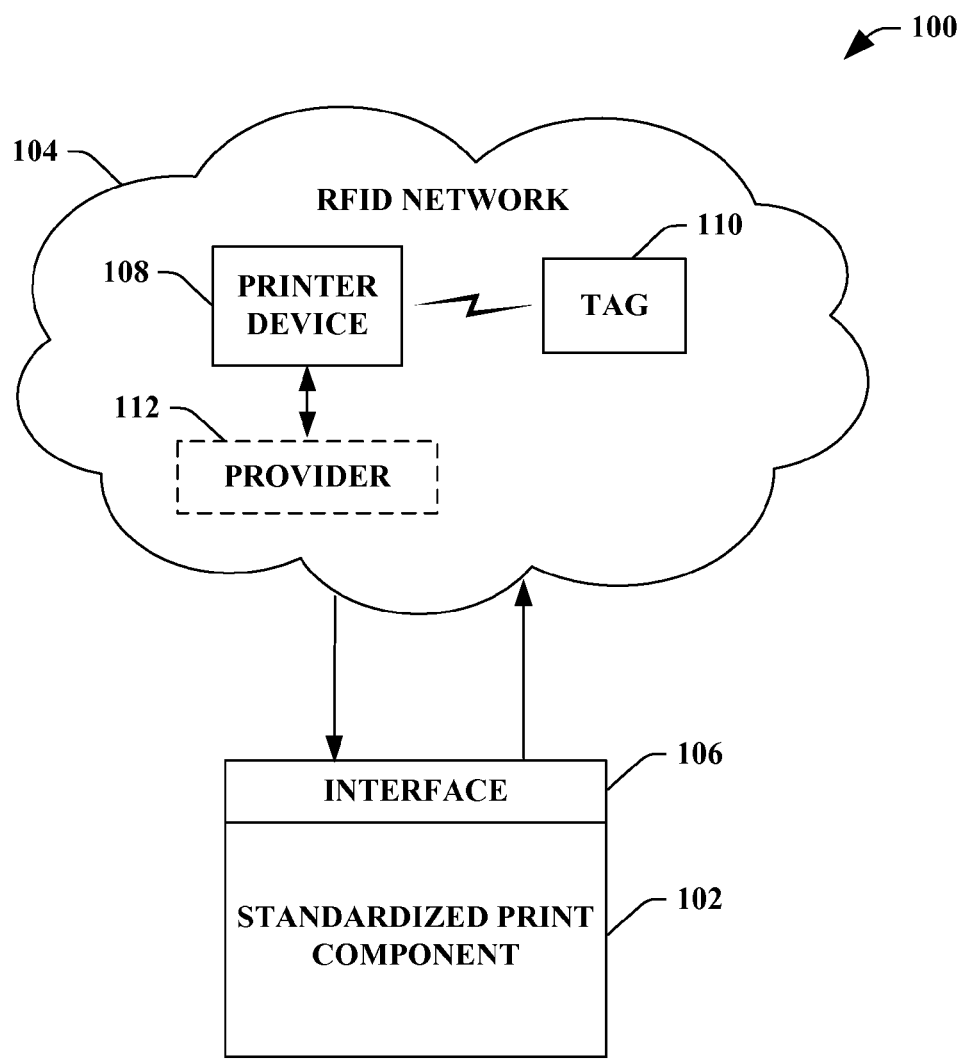
FIG. 1 illustrates a block diagram of an exemplary system that facilitates standardizing a uniform manner to implement at least one RFID printer feature independent of the RFID printer model.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "device," "tag," "network," "wizard," "process," and the like are intended to refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates standardizing a uniform manner to implement at least one RFID printer feature independent of the RFID printer model. The system 100 can include a standardized print component 102 that can receive data associated with an RFID network 104 via an interface component 106 (discussed in more detail infra and also referred to as the interface 106) in order to employ label printing universally and uniformly for at least one RFID printer device 108 (e.g., an RFID printer, a printer, etc.). Particularly, the standardized print component 102 can abstract data related to a specific RFID printer, wherein the standardized print component 102 can implement a print feature related to the specific RFID printer uniformly rather than each RFID printer utilizing a respective proprietary mechanism for a print feature. Furthermore, a provider 112 can be related to a particular RFID printer device 108, wherein the provider 112 can implement proprietary interfaces to the RFID printer device 108. For instance, the provider 112 can be a 3$^{rd}$ party component that can plug into the RFID network 104 in order to facilitate implementing standardized printing of labels and management of templates. Thus, the standardized print component 102 can allow a plurality of RFID printers of various makes, models, types, brands, vendors, etc. to be utilized in a uniform and agnostic manner. Additionally, the abstraction of the RFID printer (e.g. a model specific implementation) that can enable exposure of a print feature in a standard manner can be an object model that describes a portion of data related to the RFID printer in such standard manner. Furthermore, the RFID network 104 can include the printer device 108 that collects/transmits data from a tag 110, wherein the printer device 108 can be most any suitable RFID printer. It is to be appreciated that an RFID printer can be most any suitable RFID device that can provide a printing characteristic and such use of the term "RFID printer" can encompass an RFID printer device, an RFID printer, a printer, a label printer for RFID, etc. For the sake of brevity a single provider 112 is illustrated. However, it is to be appreciated that there can be a plurality of providers that correspond to the various types, brands, makes, models, etc. of RFID printer devices 108. In other words, there can be a provider (e.g., the provider 112) for each RFID printer device 108, where such provider can implement a proprietary interface to the specific RFID printer device 108. Moreover, the provider 112 is not illustrated in the following figures but it is to be appreciated that at least one provider can be utilized for the RFID printer device 108.

For example, the standardized print component 102 can evaluate a plurality of printer devices 108 associated with the RFID network 104 in order to enable universal utilization of such device features. In particular, the device evaluation can detect brand, type, model, maker, vendor corresponding provider, serial number, digital signature, reference name, printing features, printing capabilities, most any suitable characteristic associated with the printer device 108 to distinguish from a disparate device, etc. For example, the provider 112 can provide the specific data related to the particular RFID printer device 108. Based at least upon the evaluation of the device(s) 108, the standardized print component 102 can extrapolate a generic and universal technique to utilize a feature related to the printer device 108 (e.g., the RFID printer), wherein the universal and generic technique is compatible with most any suitable printer device 108 that can provide the feature. In other words, the standardized print component 102 can evaluate a plurality of independent and distinct RFID printers and seamlessly allow various print features associated therewith to be utilized in a standardized and/or agnostic manner. It is to be appreciated that the print feature can be, but is not limited to being, a label print, a print setting, a printer configuration, data related to a field for a label (e.g., text field, barcode field, RFID field, image field, boxes, lines, circles, shapes, corners, constant images, vertical duplication, horizontal duplication, raw fields, etc.), data related to a print template, a parameter to print, a print job, a text field print, a variable field print, a bar code print, a variable that can be printed, or most any suitable print capability associated with a printer.

It is to be appreciated that the printer device 108 within the RFID network 104 can receive a signal from and/or transmit data to, for instance, at least one tag 110 and/or a plurality of tags. In one example, the tag 110 can contain an antenna that provides reception and/or transmission to radio frequency queries from the printer device 108. Furthermore, it is to be appreciated that the printer device 108 within the RFID network 104 can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Additionally, although a single printer device 108 and tag 110 are depicted, it is to be appreciated that a plurality of devices 108 and tags 110 can be utilized with the system 100, wherein each printer device 108 and/or tag 108 can be of various makers, models, types, brands, etc.

In one example, the RFID network 104 can include at least one printer device 108 that is associated with at least one RFID process (not shown). The RFID process can be related to a particular RFID sub-system (e.g., an RFID server, RFID network, etc.) that is an uber or high-level object that forms together various entities to create a meaningful unit of execution. The RFID process can be and/or can include an outbound process (e.g., pick, pack, shipping scenario, etc.), a manufacturing process, a shipping process, a receiving process, tracking, data representation, data manipulation, data application, security, etc. For instance, the RFID process can utilize the received tag data for processing within a pipeline allowing various components (e.g., event handlers, filters, transforms, aggregations, managed code running in the context of the RFID process, etc.) to implement such data as necessary. Additionally, the RFID process can include and/or respond to a device service, a tag read, an event, a tag write, a device configuration, a geographic tracking, a number count, etc. It is to be appreciated that the process can have raw data collected via at least one device associated with the RFID network 104, wherein such raw data can be manipulated based at least in part upon a rule and/or a business rule engine (not shown).

Moreover, the system 100 can include any suitable and/or necessary interface component 106 (herein referred to as "interface 106"), which provides various adapters, connectors, channels, communication paths, etc. to integrate the standardized print component 102 into virtually any operating and/or database system(s). In addition, the interface 106 can provide various adapters, connectors, channels, communication paths, etc., that provide for interaction with the standardized print component 102, the RFID network 104, the RFID process, and any other device, tag, and/or component associated with the system 100.

Figure 2:
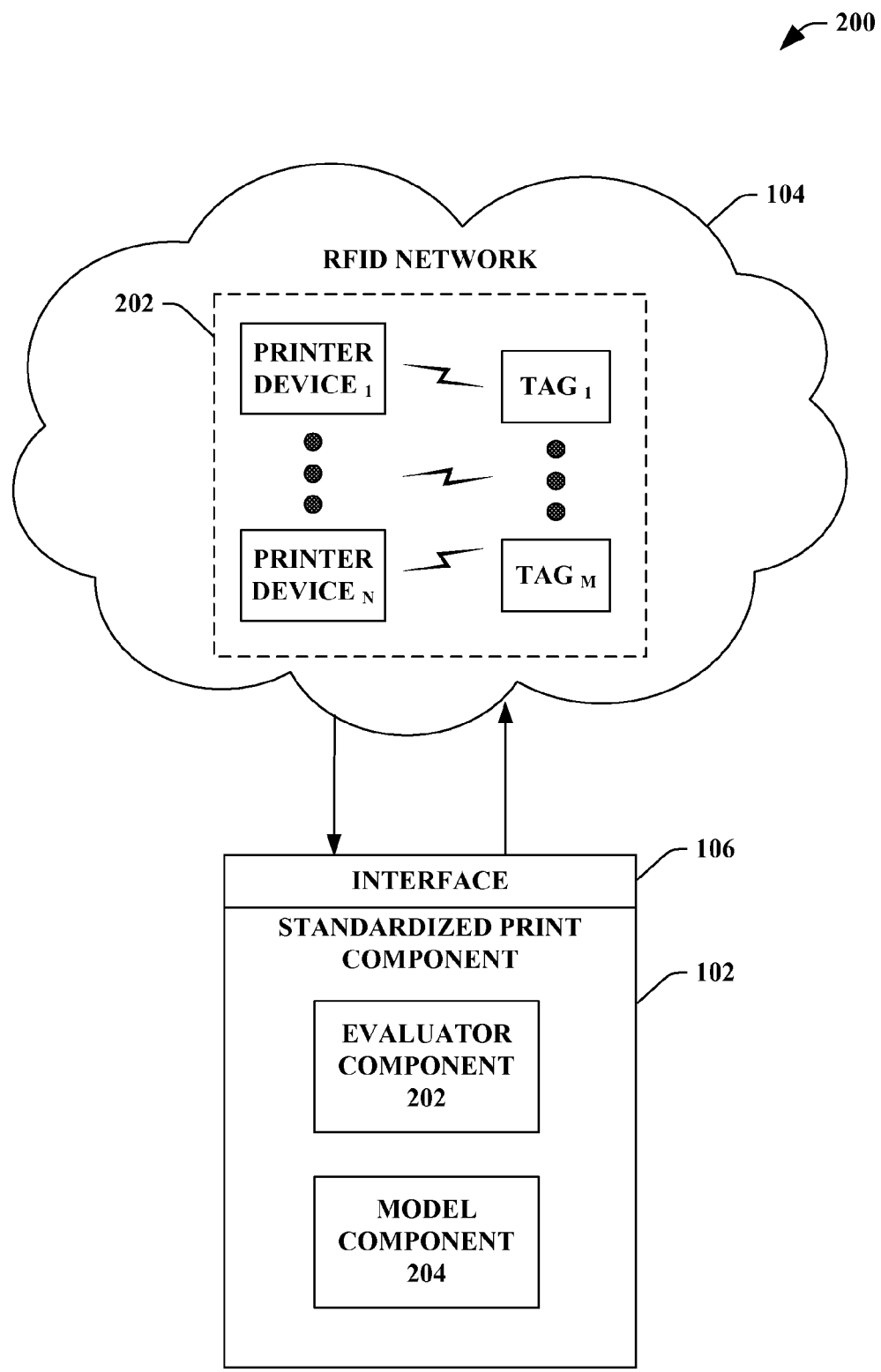
FIG. 2 illustrates a block diagram of an exemplary system that facilitates evaluating at least one RFID printer within an RFID network to employ a standardized and uniform technique for printing.

FIG. 2 illustrates a system 200 that facilitates evaluating at least one RFID printer within an RFID network to employ a standardized and uniform technique for printing. The system 200 can include the standardized print component 102 that can extract data specific to a feature related to a particular RFID printer (e.g., a device within the RFID network 104), wherein such extraction can be utilized to generate a universal manner to utilize the particular RFID printer independent of such specific features, settings, configurations, etc. Moreover, it is to be appreciated that the standardized print component 102 can enable universal printing capabilities to a plurality of RFID printers regardless of each RFID printer proprietary mechanisms/techniques associated therewith. In other words, the system 200 can allow a plurality of disparate RFID printers to be utilized (e.g. at least one print features) generically and/or universally (e.g., the print feature can be employed uniformly to each disparate RFID printer).

The standardized print component 102 can include an evaluator component 202 that can facilitate evaluating at least one device associated with the RFID network 104. Specifically, the RFID network 104 can include a plurality of RFID printers with respective details and/or characteristics associated therewith, wherein the evaluator component 202 can assess data related to at least one RFID printer to enable an evaluation associated with at least one print feature respective to the RFID printer. Furthermore, the evaluator component 202 that can receive data and/or evaluate a provider (not shown but discussed in FIG. 1). The evaluator can receive device-specific data from the provider and/or evaluate at least one provider to ascertain the various proprietary interfaces and/or respective data to communicate therewith. Moreover, the standardized print component 102 can utilize a model component 204 that can generate a universal model of at least one RFID printer based at least in part upon the data assessment and/or evaluation by the evaluator component 202. The model component 204 can create an abstract specific to a particular RFID printer and can enable a universal and/or uniform exposure of a print feature in a standardized manner. In other words, the evaluator component 202 can identify model-specific data with an RFID printer, wherein the model component 204 can abstract such data to allow a standardized mechanism/technique to utilize such RFID printer. In particular, the model component 204 can generate an object model that can be an RFID printer model-specific implementation that can be exposed in order to utilize a print feature universally.

The RFID network 104 can be implemented by any enterprise, business, facility, and/or any suitable entity that can utilize RFID technology. For instance, the RFID network 104 can be deployed to include any number of RFID printer devices and tags 202 such as $device_1$ to $device_N$, where N is positive integer. Moreover, such devices can interact (e.g. wirelessly communicate) with any number of tags such as $tag_1$ to $tag_M$, where M is a positive integer to provide an event, a tag read event, a tag read, etc. It is to be appreciated that the RFID printer devices can be at least one of the following: an RFID reader, an RFID writer, an RFID printer, a printer, a printing device, an RFID transmitter, a sensor, a real-time device, an RFID receiver, a real-time sensor, a device extensible to a web service, a real-time event generator, etc. In addition, the device can be associated with at least an antenna to communicate/transfer data. Furthermore, it is to be appreciated that the tags can be associated to any suitable object related to the enterprise, business, facility, and/or any suitable entity utilizing such RFID technology.

The RFID printer devices and tags 202 can be associated with at least one RFID process. It is to be appreciated that the RFID process can run in the same host as a server (not shown and also referred to as an RFID server), the standardized print component 102, and/or any combination thereof. Although only a single RFID process is discussed, it is to be appreciated that a plurality of RFID processes can be executed in conjunction with the RFID network 104. The RFID network 104 can include various sub-systems and/or groups based at least in part upon device location, device functionality, device security level, process device association, make and/or model of device, type of device, device frequency, etc. For example, an RFID network 104 can include two groups and/or collections of devices, one at a shipping door and another at a receiving door. Such RFID network 104 can further include a process associated with each groups and/or collection of devices. For instance, the process can be a shipping process that is related to the devices at the shipping door, wherein the devices can collect data at such location. Similarly, another process can be a receiving process that is related to the devices at the receiving door, wherein the devices can collect data at such location.

Furthermore, the RFID process can be a business process, wherein the devices can be indirectly utilized in association with the business process (not shown). In an example, an RFID stack can bridge the gap between devices and business applications. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time.

In another example, an RFID host and/or server associated with the RFID network 104 can utilize a business rules engine (not shown), wherein such business rules engine can provide a rule-based system in association with any application related to the RFID network 104 such that a filter and/or alert can be utilized as a rule(s). The business rules engine can execute declarative filters and/or alerts as rules associated with an RFID network 104, wherein the rules can include a rule set adhered to an event, condition, and action format utilizing an extensible markup language (XML). The rule is at least one of the following: contained within a rule set that adheres to an event, a condition, an action; and/or represented utilizing an extensible markup language (XML). Moreover, the condition has at least one of a set of predicates and/or a logical connective to form a logical expression that evaluates to one of a true and a false.

The RFID process (also referred to as the process) can be an uber and/or high-level object that can provide a meaningful unit of execution. For instance, the process can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the process can write to a tag process, wherein a tag can be written in real-time based at least upon an input. The write process can also check if the write succeeded by reading and passing data back to the host.

Figure 3:
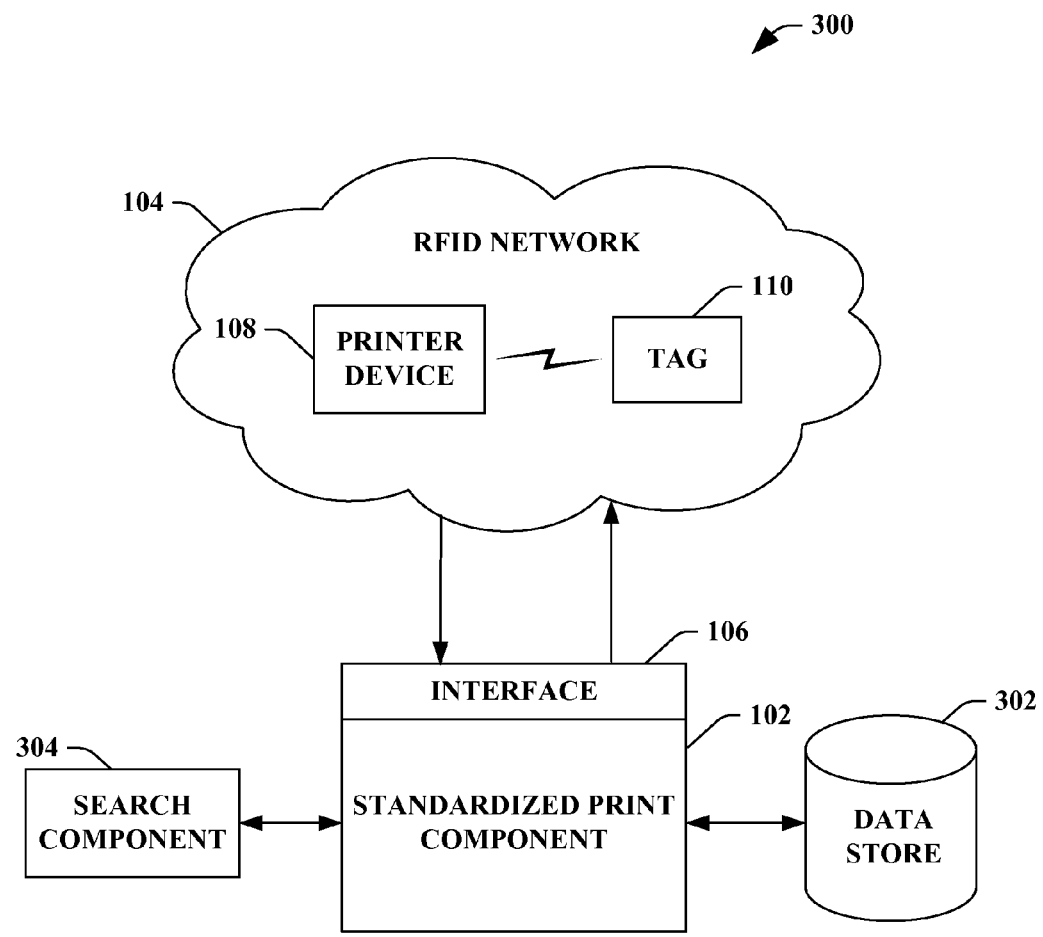
FIG. 3 illustrates a block diagram of an exemplary system that facilitates abstracting an RFID printer within an RFID network to implement at least one print feature associated therewith in a universal manner.

FIG. 3 illustrates a system 300 that facilitates abstracting an RFID printer within an RFID network to implement at least one print feature associated therewith in a universal manner. The system 300 can include the standardized print component 102 that can evaluate at least one printer device 108 (e.g. an RFID printer, a printer, a print device, an RFID device capable of a print function, etc.) within the RFID network 104 in order to abstract a model-specific implementation of the device and enable exposure of a printing feature in a standard manner. The system 300 can further include a data store 302 that can store various data related to the system 300. For instance, the data store 302 can include most any suitable data related to most any suitable printer device 108 associated with the RFID network 104, an RFID printer, a printer, most any suitable printer device 108 that is capable of a print function, etc. For example, the data store 302 can store data such as, but not limited to, device data (e.g., make, model, brand, type, version, vendor, etc.), device characteristics (e.g., printer, reader, writer, location, functionality, print feature, print functionality, etc.), printer software, print features, RFID printer data, RFID printer templates, RFID printer label data, RFID printer label fields, etc.

The data store 302 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 302 of the subject systems and methods is intended to comprise, without being limited to, these and any other suitable types of memory and/or storage. In addition, it is to be appreciated that the data store 302 can be a server, a database, a relational database, a hard drive, a pen drive, an external hard drive, a portable hard drive, and the like.

The upgrade component 102 can utilize a search component 304 that identify data related to an RFID printer within the RFID network 104. The search component 304 can locate, for instance, a print feature associated with an RFID printer, an RFID printer, a print template, an RFID print job, a status related to an RFID print job, a print label, data related to a print label, prior print jobs, data related to a prior print job/label, user data related to manipulation of a print job (e.g., a user starting a print job, a user changing data associated with an RFID printer, a user terminating a print job, etc.) or most any suitable data related to an RFID printer. For example, the search component 304 can locate an RFID printer and a respective print job to ascertain details associated with the RFID printer and/or print job. In another example, the search component 304 can identify data respective to at least one of an RFID printer (e.g., RFID printer vendor, software, model, type, brand, etc.), a user and/or machine that can manipulate an RFID printer, a user and/or machine that can manipulate a print job, a print job status, a previous print job, or most any suitable data related to printing within the RFID network 104.

The standardized print component 102 can employ various printer specific commands in a universal and/or standardized manner such that a print feature can be applied and/or utilized generically within the RFID network 104 regardless of the RFID printer type, model, make, brand, vendor, features, etc. Moreover, it is to be appreciated that the system 300 can enable most any suitable printer command within and/or associated with the RFID network 104. The following table can be an exemplary illustration of a list of printer specific commands that can be implemented by the standardized print component 102, wherein such list is not exhaustive:

| Command | Response | Description | Implementation Requirement for independent hardware vendors (IHVs) |
| --- | --- | --- | --- |
| AddPrintTemplate (byte[ ] template) | Status Code and/or Error | Loads a print template on a device | Recommended |
| RemovePrintTemplate (string templateName) | Status Code and/or Error | Removes a print template from a device | Recommended |
| GetAllPrintTemplates( ) | A collection of the contents of all the templates | Gets the content of all the templates | Recommended |
| GetAllPrintTemplateNames( ) | All collection of all the template names | Gets the names of all the templates | Recommended |
| GetPrintTemplate (string templateName) | The actual content of the specified template | Gets the content of the specified template | Recommended |
| GetCurrentPrintTemplateName( ) | Name of the current template | Gets the name of the Current template | Mandatory |
| SetCurrentPrintTemplateName (string templateName) | Status Code and/or Error | Sets the name of the current print template to use for printing tag labels | Mandatory |
| GetStandardizedPrintTemplate (string templateName) | The standardized print template | Gets a print template from the device in its standardized form | Recommended |
| PrintTag (PrintLabel label, Dictionary<string, FieldIncrementInfo> fieldIncrements, | Status Code and/or Error | Prints one or more labels based on the specified | Mandatory |

-continued

| Command | Response | Description | Implementation Requirement for independent hardware vendors (IHVs) |
|---|---|---|---|
| byte[ ] passcode, int count) | | information | |
| GetPrintTemplatePreview (string templateName, bool retrieveThumbnailOnly) | The preview image of the specified template in thumbnail form or bigger size | Retrieves the template image | Recommended |
| GetPrintLabelPreview (PrintLabel printLabel, bool retrieveThumbnailOnly) | The preview image of the label to be printed in thumbnail form or bigger size | Retrieves the print preview for a given print label. This is based on the current template | Recommended |

To execute a print job through the RFID network 104, a user can supply the values for the various parameters associated with the print job. This can include the values for at least one of the various RFID fields (e.g., tag ID, tag data, bar code data, etc.), the values for the variable text fields, or the values for the variable bar codes. It is to be appreciated that the system 300 can be utilized to print more than one label and/or provide more than one print job. If it is for printing more than one label, the user can specify the number of labels and/or the measure by which each field can be incremented in each label. The actual field in the template may or may not be defined as an incremental field, but the system 300 can employ the "increment" concept which can be leveraged to increment such a field.

The variable field names can match the names defined in a printer template and/or format that can be loaded in an RFID printer (e.g., a printer). A schema for these files can be defined by, for instance, the printer manufacturer. Typically, the user can be aware of the template schema and has to identify the variable fields in the template and then has to supply the above information for such fields. The subject innovation can make the printing procedure easier for a Print administrator to supply values for the variable fields. The system 300 can simplify this user experience by providing an object model to describe a loaded printer template in a standard way. For example, a printer can have a template file loaded currently. A print administrator may want to execute a print job by defining the values for the variable text fields, variable barcodes, and also wants to define the field increments in a PrintTagCommand. The print administrator can utilize GetStandardizedPrintTemplateCommand to retrieve information about the template fields which will help populate such fields for the print job, in a device/provider/vendor agnostic manner.

From a user perspective, the dynamic and/or variable fields can be important when it comes to printing an RFID label because with a PrintTagCommand, a user may need to provide a value for these fields. The various types of variable fields can be at least one of the following: Variable text fields (e.g., could be incremental or non-incremental); Variable barcode fields (e.g., could be incremental or non-incremental); Variable RFID fields (e.g. could be incremental or non-incremental); or Variable image fields (e.g. name of the logo/image). The constant fields in the template can be at least one of the following: Constant text fields; Constant bar codes; Constant RFID fields; Boxes, lines, circles, ellipses, shapes, etc.; Corners—can be represented by the provider as multiple "lines;" Constant images; or Vertical duplication and/or Horizontal duplication—can be split up by a provider (e.g., device maker, service provider for a particular device, etc.) into the "raw fields."

Figure 4:
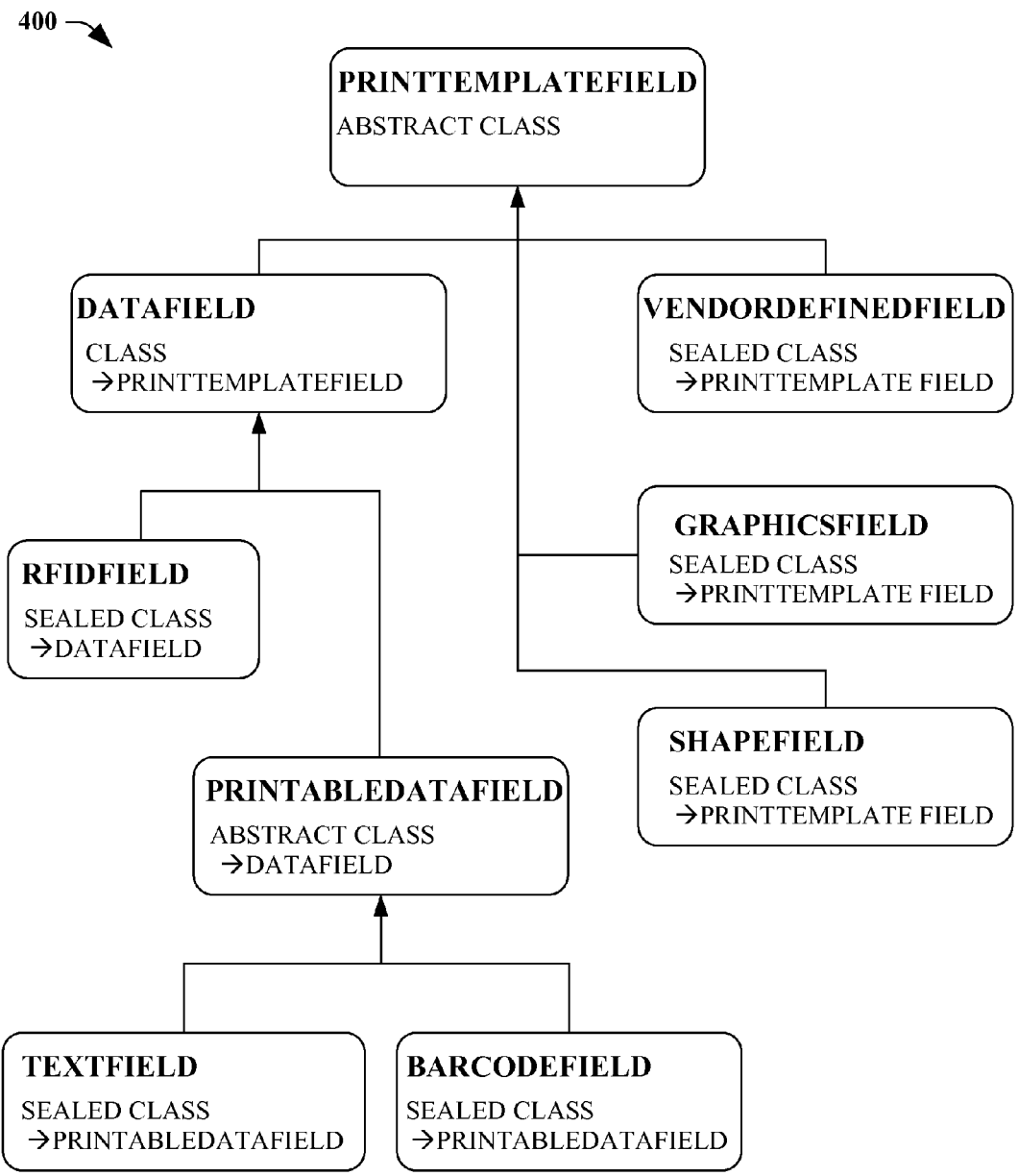
FIG. 4 illustrates a block diagram of an exemplary class hierarchy in accordance with the subject innovation.

FIG. 4 illustrates a class hierarchy 400 in accordance with the subject innovation. The information in a print template (which can be authored in a printer specific language) can be mapped to a list of PrintTemplateField objects (defined in for example, the RFID network 104, a device service provider interface (DSPI), and/or most any suitable combination thereof). The PrintTemplateField class is an abstract class which can be a root of the class hierarchy. DataField is a class which represents any field that can hold data such as a text field, barcode field, a RFID field, or just a non-printable placeholder datafield. The class hierarchy 400 is an overview exemplary class structure and the subject innovation is not to be so limited.

For example, PrintTemplateField can have at least one of the following properties: field description, field name, or vender defined parameter. The DataField can include the properties dependent on fields, field data, or increment option as well as a method such as data field or to string. RfidField can include a tag data field name or a tag identifier field. PrintableDataField can include a property such as a column location, a field rotation, or a row location. Moreover, the PrintableDataField can include a method such as a printable data field, or a to string. TextField can include a property such as character rotation, font, height magnifier, is bold, is italics, is reverse print, is transparent field, is underline, or width magnifier. BarcodeField can include a property such as barcode density, barcode font, or barcode height. VendorDefinedField can include a property such as field type, or vendor name. Moreover, VendorDefinedField can include a method such as a to string or a vendor defined parameter. GraphicsField can include a property such as ending column, ending row, starting column, or starting row. ShapeField can include a property such as ending column, ending row, field type, starting column, starting row, or thickness.

For example, the subject innovation can build a GetStandardizedPrintTemplate response. The response can contain a representation of the template information for the specified template. The GetStandardizedPrintTemplateResponse contains a StandardizedTemplate property which is a Collection<PrintTemplateField>. The provider can map each field defined in the print template to an appropriate PrintTemplateField object and add it to the collection of PrintTemplateField objects. This collection can be returned through the StandardizedTemplate property in the GetStandardizedPrintTemplateResponse.

A PrintTemplateField object can be identified by a field name. For the variable text and barcode fields, this could be the actual field name (or number) defined in the template, whereas for the constant fields, this could be a generated name (in case the template doesn't support the concept of a name for a constant field). For RFID fields, this can be one of the two standard constants (discussed in more detail below in reference with RFID fields). A PrintTemplateField can have an optional FieldDescription property. One option can be to set this based on the comments given in the template for a particular template field.

The DataField class can be the common ancestor for RfidField, TextField and BarcodeField. A DataField could be a constant field or it could be a variable field (represented by setting the FieldData property to either a VariableDataDescription or a ConstantDataDescription object). Non-printable data fields (e.g., fields which are just meant as placeholders) can be represented directly using the DataField. The name for a variable image field (e.g., the name of an image that is already loaded on the printer) could be also be represented using a DataField. Constant fields such as Lines, boxes, circles, ellipses, shapes can be represented using the ShapeField. A Graphics field just captures the rectangular boundary represented by a constant image. There may be support added for a full representation of constant image fields in a template. A VendorDefinedField can be used to build a custom PrintTemplateField not covered by the existing object model in accordance with the subject innovation. If the template defines that the content of one variable field is dependent on one or more fields, this dependency can be represented using the DependentOnFields property in the DataField class. For a given field type (e.g., TextField, BarcodeField, etc.), the provider can set its properties based on the information defined for that field in the template. VendorDefinedParameters can be added to most any PrintTemplateField type to represent most any custom properties of a field. Information on whether a field is defined as an "Increment" field can be represented using the IncrementOption property in the DataField class. There may be no ordering assumption of the PrintTemplateFields in the retrieved response. For variable fields, "data entry restrictions" or "partial fixed data" can be represented using a Regex (e.g., a regeneration expression) that is part of the "DataDescription.FieldInformation" in the DataField object (e.g. applicable for VariableDataDescription). A client application can use this regular expression to validate that a specified value for this field conforms to what is expected by the template.

An RFID field can be defined in the template and can be treated a bit differently when compared to the other fields. The FieldName for a RfidField object (e.g., that is part of the GetStandardizedPrintTemplateResponse) can be one of a RfidField.TagIdentifierFieldName or a RfidField.TagDataFieldName. The following pseudo code can be employed by the subject innovation. It is to be appreciated that the code is commented and such comments are designated with "//":

```
/// <summary>
/// The constant field name that can be used for
/// the FieldName for RFID tag identifier block.
/// </summary>
public const string TagIdentifierFieldName = "TagIdentifier";
/// <summary>
/// The constant field name that should be used for
/// the FieldName for RFID tag user data block.
/// </summary>
public const string TagDataFieldName = "TagData";
```

If the template defines an RFID field as including multiple sub-fields, a provider can expose it as a single RfidField. For instance, if the TagID field is defined in the form of four sub-fields in a template, the Collection<PrintTemplateField> in GetStandardizedPrintTemplateResponse can have one RfidField object in the collection, and not four RfidField objects.

There can be maximum of two RfidField objects (e.g., one for TagIdentifier and one for TagData) in the response collection. To support increments for the RFID fields, the standard fieldnames RfidField.TagIdentifierFieldName and RfidField.TagDataFieldName can be used in the increment dictionary (e.g., that can be part of the PrintTagCommand) to define increments for the TagID and TagData respectively. During a PrintTagCommand execution, the provider can map and apply this increment information to the right RFID (sub) fields. Please note that increment information can be specified on the complete RFID field and not on the individual sub-fields. PrintTagCommand: The values for the TagID and the TagData are still provided as byte[ ] (e.g., one byte[ ] each for the TagID and TagData) and not as part of the textAndBarcodeFieldsDictionary.

The subject innovation can utilize a print tag command and/or a response. PrintTagCommand can take tag id, tag data, optional access (lock) code and kill code to set on the tags. It also takes a dictionary of <string, string> which is used for providing values for the variable text fields and the barcodes (field name vs. field value). Print Tag command supports two modes of printing tag and its associated label: (1) Single command prints a single tag and its associated label. Set the count field to a default value (e.g., one); and (2) Single command prints tags and associated labels in batch mode; the count field needs to be set to number of tags to print. Increments for the text fields, barcodes and the tag information are provided as a dictionary of name versus increment information. In this mode, the PrintTagCommand implementation can return a response immediately after scheduling the batch operation and should not wait for the entire batch to complete.

The subject innovation can provide increment information and/or increment information in the field increments dictionary. This section explains the format of the increment information used in the PrintTag command. Field increments can apply to text fields also and not necessarily fields with numeric values. The following pseudo code can be utilized to provide exemplary semantics for increments as described in the subject innovation (please note that comments are identified with "//":

```
/// <summary>
/// Represents the encoding of data. This can be used to represent
/// data in a datafield or to define how an increment operation should
/// treat the data.
```

-continued

```
/// </summary>
public enum DataFormat
{
   Binary,
   Decimal,
   Hexadecimal,
   String
}
/// <summary>
/// Represents the value part of the IncrementsDictionary that is
/// used in PrintTagCommand
/// </summary>
public sealed class FieldIncrementInfo
{
   /// <summary>
   /// The value by which a field should be incremented.
   /// </summary>
      private long m_increment;
   /// <summary>
   /// The starting position in the data
      /// for which the increment is applicable.
      /// </summary>
      private long m_startPos;
   /// <summary>
   /// The endng position in the data for which
      /// the increment is applicable.
   /// This should be greater than or equal to the start position.
      /// </summary>
      private long m_endPos;
   /// <summary>
   /// Specifies the encoding type for the
      /// block of data that needs to be incremented
      /// </summary>
      private DataFormat m_incrementFormat;
}
```

The incrementsDictionary parameter in the PrintTagCommand can be a mapping of the fieldname (string) to the FieldIncrementInfo object defined above.

This section just provides a general overview of how the increment dictionary defined in the PrintTagCommand can be related to the increment information defined in the template. Increments can be achieved in one of the following ways: (1) Field marked incremental in the template, increment information also specified in template; (2) Field marked incremental field in the template, increment information specified at execution time; or (3) Field not specified as incremental field, but not increment information specified at the time of execution. For (1), the increment data and the starting data can be specified in the template itself. If it is a variable field whose increment information (e.g., how much to increment by, etc.) has been specified in the template itself, as a policy, increments for such fields may not be allowed to be specified at the PrintTagCommand level (e.g., the RFID Services will validate this), the reason being that it could be confusing to have two sets of increment data for the same field. For (2), the increment data and the starting data can be specified as part of the batch execution. The template itself does not have this data. For (3), the provider does the increment and sends the desired incremented data to the printer. The provider does the increment in this case, but template itself is loaded on the printer, so the provider should be able to associate the supplied field name with that of the template.

Figure 5:
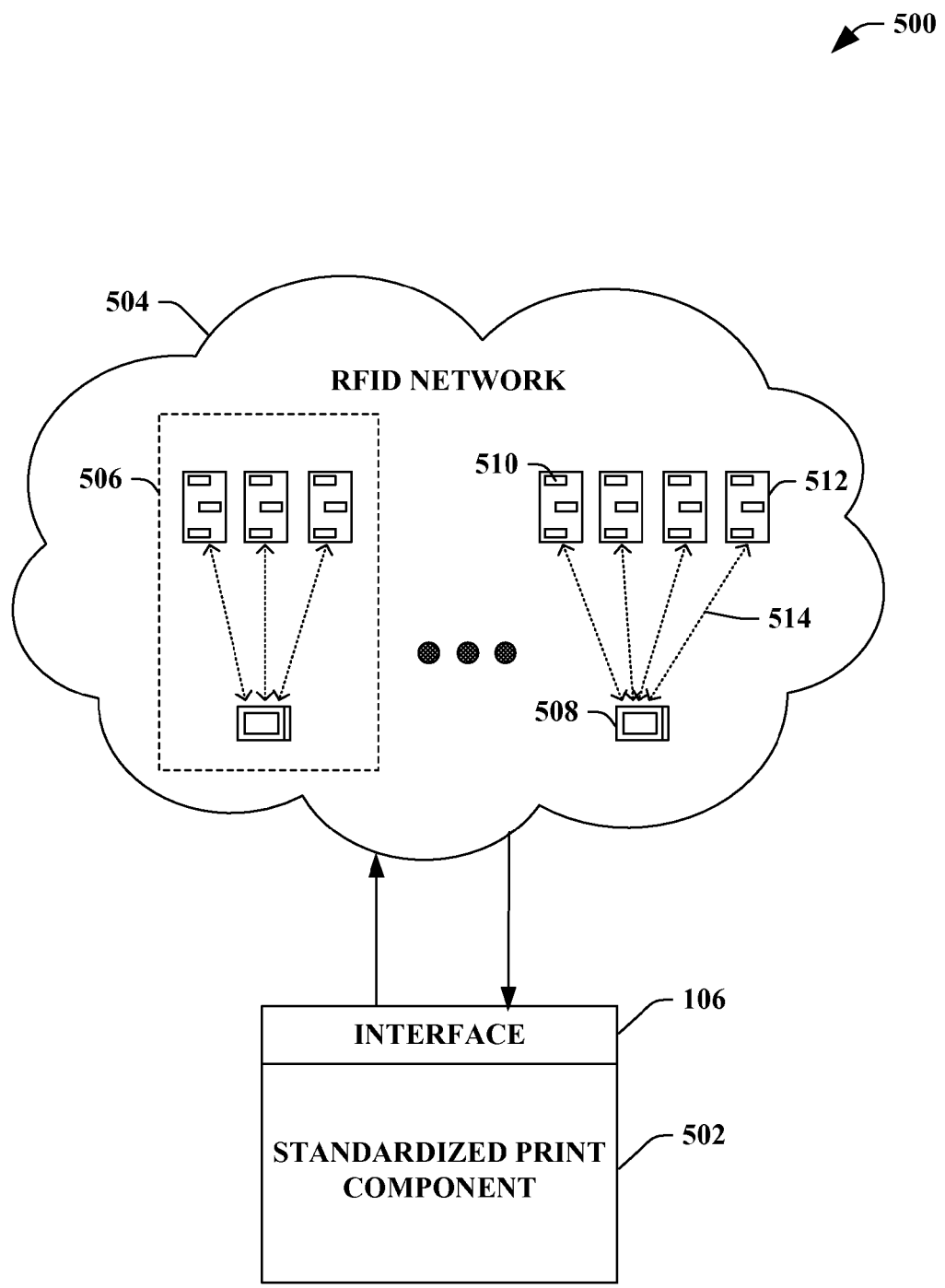
FIG. 5 illustrates a block diagram of an exemplary system that facilitates collecting data from an RFID device within an RFID network.

FIG. 5 illustrates a system 500 that facilitates collecting data from an RFID device within an RFID network. The system 500 can include a standardized print component 502 that can abstract a model-specific implementation of an RFID printer within an RFID network 504 and enable exposure of a printing feature associated therewith in a standardized manner. In other words, the standardized print component 502 can allow most any suitable print feature to be utilized with most any suitable RFID printer. It is to be appreciated that such print features can be enabled via a generic and/or uniform interface (not shown) that can bridge communication from the abstracted implementation to the specific physical RFID printers. Furthermore, it is to be appreciated that the standardized print component 502 and the RFID network 504 can be substantially similar to previously described figures.

The RFID network 504 can include a plurality of universes (e.g., sub-systems, RFID networks), wherein a universe is a server of RFID entities. For simplicity, the RFID network 504 illustrates a single universe containing two collections of devices (e.g., device collections), where a first collection 506 is shown. It is to be appreciated that the device collections can correspond to device groups as utilized by the standardized print component 502, wherein such collections and/or groups can be based on at least one of the following: device physical location, device functionality, device security level, process device association, make and/or model of device, type of device, device frequency, etc. For instance, an RFID sub-system can be a location wherein the entities involved are related to a substantially similar process. In one example, a sub-system can be a warehouse containing a plurality of receiving and/or shipping dock doors with associated devices. Thus, first collection 506 can be a collection of devices within the specified sub-system. It is to be appreciated a plurality of collection of devices can be implemented. Within a collection of devices, a device 508 can receive an RFID signal 514 from a pallet of goods 512 containing at least one RFID tag 510. It is to be appreciated the pallets and/or goods can be tagged based at least upon user specifications (e.g., single pallets tagged, individual goods tagged, pallets and goods tagged, etc.).

Figure 6:
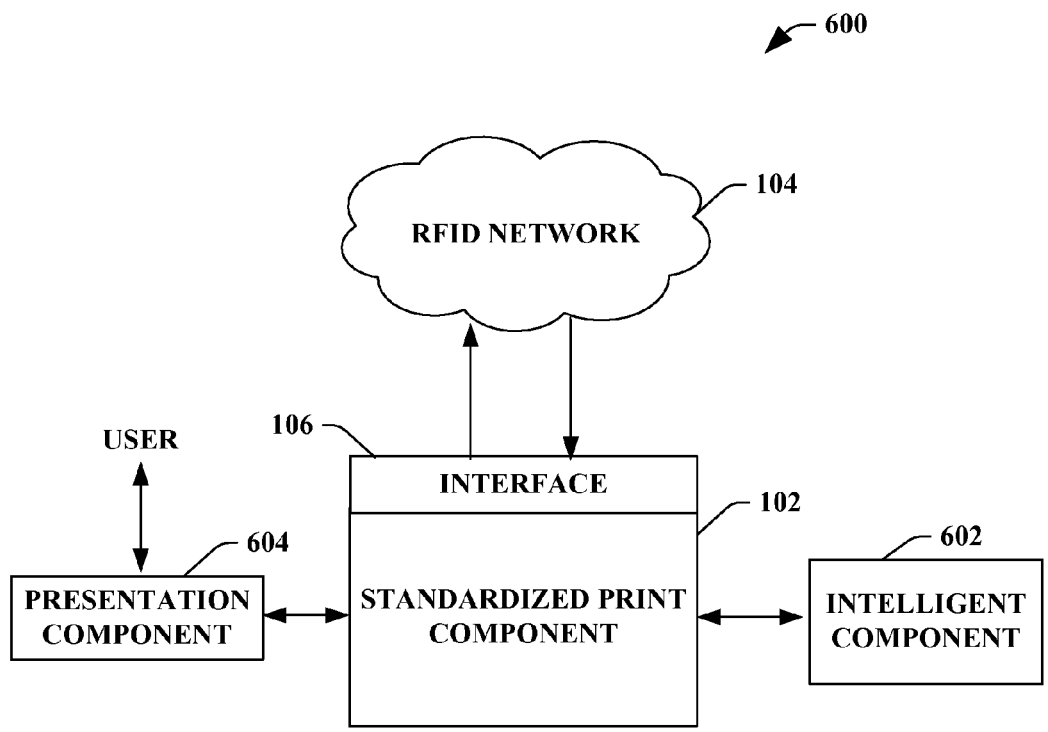
FIG. 6 illustrates a block diagram of an exemplary system that facilitates providing at least one print feature uniformly for a plurality of RFID printers within an RFID network.

FIG. 6 illustrates a system 600 that employs intelligence to facilitate providing at least one print feature uniformly for a plurality of RFID printers within an RFID network. The system 600 can include the standardized print component 102, the RFID network 104, and the interface 106 that can all be substantially similar to respective components and interfaces described in previous figures. The system 600 further includes an intelligent component 602. The intelligent component 602 can be utilized by the standardized print component 102 to facilitate evaluating an RFID printer to extrapolate a generic and universal mechanism/technique for a print feature associated therewith. For example, the intelligent component 602 can infer device data, device make, device model, device type, device characteristics, device settings, device brand, device printer software, a portion of software applicability, applicability of software for a specific device, a version of software, a version of a device, a deployment setting for a device, a vendor related to the RFID printer, RFID printer data, RFID printer settings, a print feature, a printer template, an increment associated with a print template, data related to a print template, data to be printed, data associated with a printing label, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The standardized print component 102 can further utilize a presentation component 604 that provides various types of user interfaces to facilitate interaction between a user and any component coupled to the standardized print component 102. The presentation component 604 can provide most any suitable graphical user interfaces and/or user interfaces to view/display data transmission and/or data communication in connection with the system 600. For instance, the presentation component 604 can be a window, an application programmable interface (API), a GUI, a UI, a stand-alone application, and the like, wherein such presentation component 604 can be related to the RFID network 104. As depicted, the presentation component 604 is a separate entity that can be utilized with the standardized print component 102. However, it is to be appreciated that the presentation component 604 and/or similar view components can be incorporated into the standardized print component 102 and/or a stand-alone unit.

The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the standardized print component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

FIGS. 7-8 illustrate exemplary user interfaces in accordance with the claimed subject matter. It is to be appreciated that the user interfaces depicted are examples and the subject innovation is not to be so limited. In addition, it is to be appreciated that there are a plurality of nuances and/or subtleties that can be employed in connection with the user interfaces, thus any depiction is utilized to facilitate implementing the claimed subject matter.

An RFID network and/or architecture can provide standardized print features utilizing various print devices as described in the claimed subject matter. For example, the subject innovation can employ a "Print Label Wizard" which can facilitate the standardization of the various devices. It is to be appreciated that the claimed subject matter can include most any suitable technique and/or mechanism to implement a universal manner to provide print features associated with devices and the subject innovation is not be limited to the use of a "wizard."

FIG. 7 illustrates exemplary user interfaces that facilitate generating a standardized print template for an RFID printer in accordance with the subject innovation. A user interface 700 can provide the selection of a print template and/or specify a data source. The user interface 700 can be launched upon an activation of a device (e.g., right-clicking on an RFID printer and selecting the "Print" menu-item, etc.). It is to be appreciated that such option can be made available if the selected device supports such functionality. Within the user interface 700, a user can first select a template from a list of print templates (e.g., retrieved using GetAllPrintTemplate-Names command). The user can also see a thumbnail image of the selected template (e.g., GetPrintTemplatePreview command with RetrieveThumbnailOnly property set to true), and can also optionally see a bigger size preview by clicking on the "Preview" button (e.g., GetPrintTemplatePreview command with RetrieveThumbnailOnly property set to false). The user can also specify whether the inputs for the print operation are going to be specified manually or if they are going to be driven from an external data source.

As discussed above, the claimed subject matter can support the following optional capabilities which can help retrieve the preview images for a template/label in at least one of a thumbnail form or as a larger sized image. (1) Template Preview—given a template, a preview of the template image can be returned. For example, the template preview can utilize the following command, GetPrintTemplatePreview (string templateName, bool retrieveThumbnailOnly). (2) Label Preview—given a PrintLabel (e.g. which can contain the user supplied values for the variable fields), the actual print preview of the label can be returned. This can be based on, for instance, the current template. For example, the label preview can utilize the following command, GetPrintLabelPreview (PrintLabel printLabel, bool retrieveThumbnailOnly). It is to be appreciated that the responses for both of the above commands can include a byte[ ] representation of the preview image.

A user interface 702 can provide a specification of a starting value and/or increment information manually. With the user interface 702, a user can specify the number of labels to be printed and provide the values for the variable template fields. It is to be appreciated that this list can be populated through the use of GetStandardizedPrintTemplateCommand (e.g. discussed supra). If the number of labels is more than one, the user can also specify the increment information for each variable field by clicking on " . . . ". When the user clicks on "Next", the PrintTagCommand can be triggered to print the required number of labels based on the specified information. In addition, the claimed subject matter can include a tag increment user interface (not shown), wherein the increment dialog can appear when clicking and/or activating " . . . ". The tag increment information can include at least one of the following fields: an increment by field; a start position field; an end position field; or a data format field.

FIG. 8 illustrates exemplary user interfaces for specifying data to enable a standardized print template for an RFID printer in accordance with the subject innovation. A user interface 800 can provide a data source to be selected. For example, the user can select the "Specify data from an external source" option, wherein a choice of external data sources can be identified. It is to be appreciated that most any suitable data file, data format, data location (e.g. local, remote, portable, etc.) can be implemented for data specification. For example, various computer applications and/or software can be utilized to generate and/or display data such that the data utilized therewith can be a source to specify data in accordance with the subject innovation. A user interface 802 can provide mapping at least one variable field to a column name. Based on the filename and sheetname selected in the data source selection procedure, the user can map a fieldname of a variable field in the template (e.g., retrieved using GetStandardizedPrintTemplateCommand) to a column header in the data retrieved. Clicking on "Next" can trigger and/or initiate PrintTagCommand based on the number of rows specified in the external data source.

Figure 9:
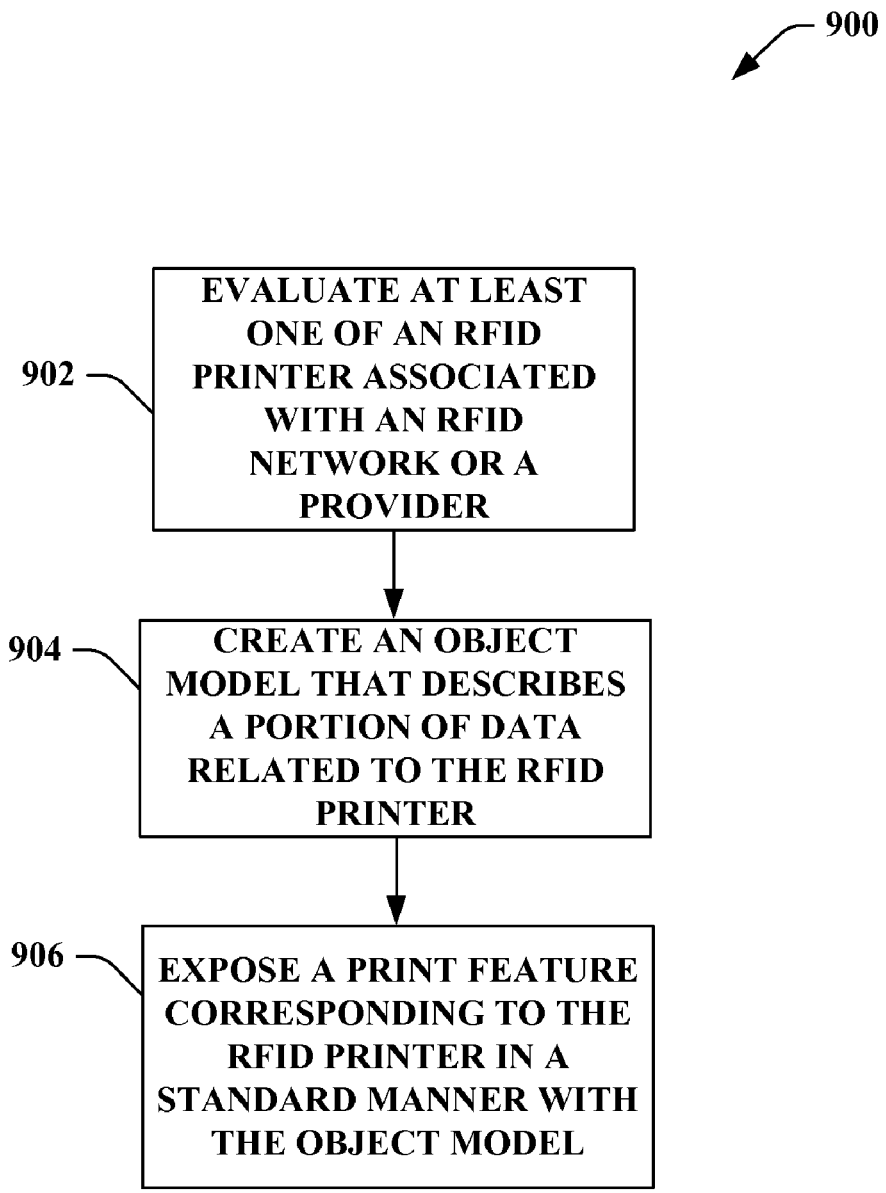
FIG. 9 illustrates an exemplary methodology that facilitates abstracting an RFID printer within an RFID network to implement at least one print feature associated therewith in a universal manner.
Figure 10:
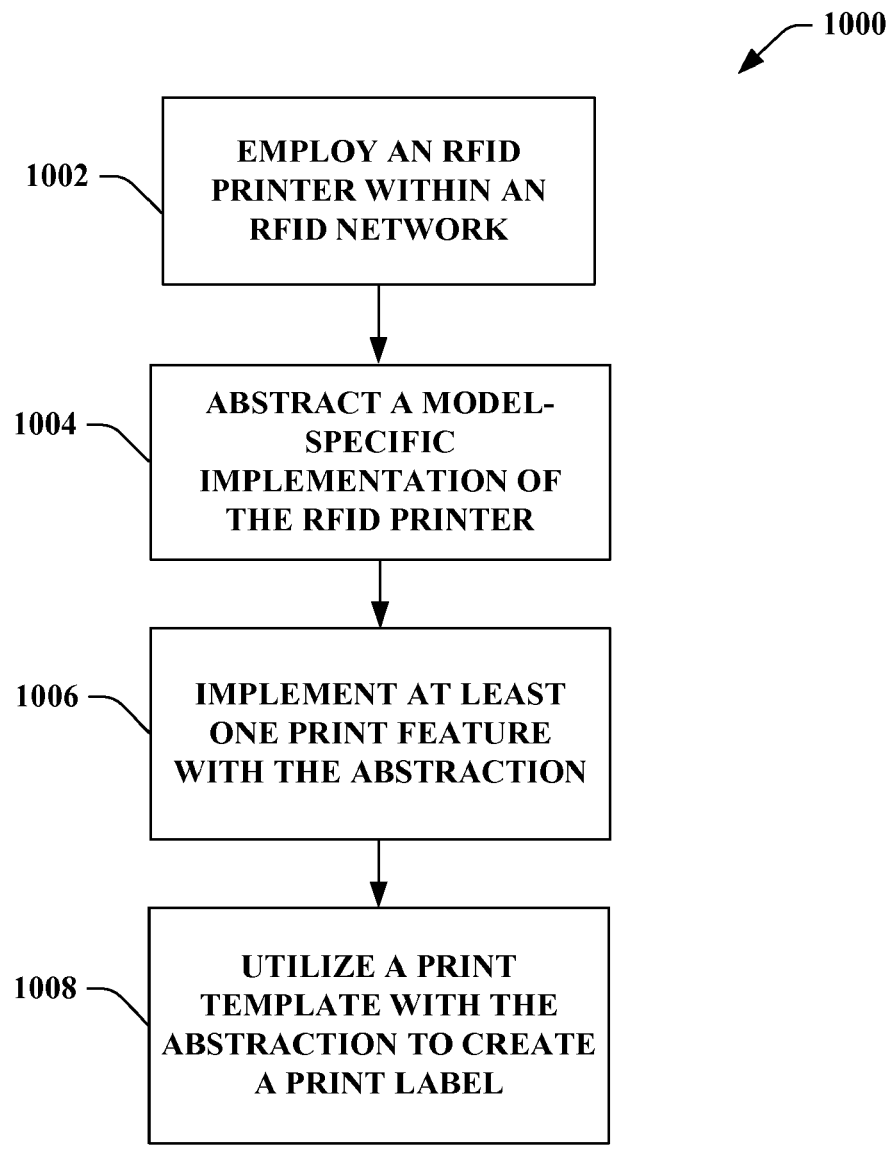
FIG. 10 illustrates an exemplary methodology for standardizing a uniform manner to implement at least one RFID printer feature independent of the RFID printer model.

FIGS. 9-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 illustrates a methodology 900 that facilitates abstracting an RFID printer within an RFID network to implement at least one print feature associated therewith in a universal manner. At reference numeral 902, at least one of an RFID printer associated with an RFID network or a provider can be evaluated. Specifically, the RFID network can include a plurality of RFID printers with respective details and/or characteristics associated therewith, wherein data related to at least one RFID printer can be monitored and/or examined. Furthermore, a provider can be related to a particular RFID printer device within the RFID network, wherein the provider can implement proprietary interfaces to the RFID printer device. For instance, the provider can be a $3^{rd}$ party component that can plug into the RFID network in order to facilitate implementing standardized printing of labels and management of templates. For instance, the following data related to the RFID printer can be evaluated and/or identified: a model; a type; a vendor; a brand; a functionality; a print feature; a print function; a print template; data related to a print template; a print label; or most any suitable data related to an RFID printer.

At reference numeral 904, an object model that describes a portion of data related to the RFID printer can be created. The object model can be generated based at least in part upon the evaluation of the RFID printer, wherein such object model can be model-specific to the RFID printer. It is to be appreciated that the RFID network can include a plurality of RFID printers with distinctive characteristics/details such that the printers can be evaluated and a common object model can be employed for the RFID printers. At reference numeral 906, a print feature corresponding to the RFID printer can be exposed in a standard manner utilizing the object model. In other words, the various RFID printers within the RFID network can be abstracted in a model-specific implementation (e.g., an object model) which can enable exposure of at least a portion of a print feature regardless of RFID printer specific data (e.g., make, model, brand, vendor, functionality, etc.).

FIG. 10 illustrates a methodology that facilitates standardizing a uniform manner to implement at least one RFID printer feature independent of the RFID printer model. At reference numeral 1002, an RFID printer can be employed within an RFID network. It is to be appreciated that the RFID printer can be most any suitable RFID device that can provide a printing characteristic and such use of the term "RFID printer" can encompass an RFID printer device, an RFID printer, a printer, a label printer for RFID, etc. The RFID network can be implemented by any enterprise, business, facility, and/or any suitable entity that can utilize RFID technology. For instance, the RFID network can be deployed to include any number of devices such as $device_1$ to $device_N$, where N is positive integer. Moreover, such devices can interact (e.g., wirelessly communicate) with any number of tags such as $tag_1$ to $tag_M$, where M is a positive integer.

At reference numeral 1004, a model-specific implementation of the RFID printer can be abstracted. At reference numeral 1006, at least one print feature can be implemented with the abstraction. Thus, a plurality of disparate RFID print devices can be abstracted to an object model, wherein such object model can enable exposure to the various print features respective to each RFID printer in a standardized and/or uniform manner. At reference numeral 1008, a print template can be utilized with the abstraction to create a print label. In other words, the print template can be implemented with the object model independent of the vendor and/or make of the RFID printer. Thus, RFID printers within the RFID network can be utilized in a uniform manner seamlessly.

FIGS. 11-13 illustrate exemplary user interfaces in accordance with the claimed subject matter. It is to be appreciated that the user interfaces depicted are examples and the subject innovation is not to be so limited. In addition, it is to be appreciated that there are a plurality of nuances and/or subtleties that can be employed in connection with the user interfaces, thus any depiction is utilized to facilitate implementing the claimed subject matter. FIG. 11 illustrates a user interface 1100 that can provide an introduction to input data for printing. The user interface 1102 can allow a print template to be selected. FIG. 12 illustrates a user interface 1200 that can select a data source. A user interface 1202 can allow print information to be collected. FIG. 13 illustrates a user interface 1300 that can map required fields. A user interface 1302 can provide a summary.

Figure 14:
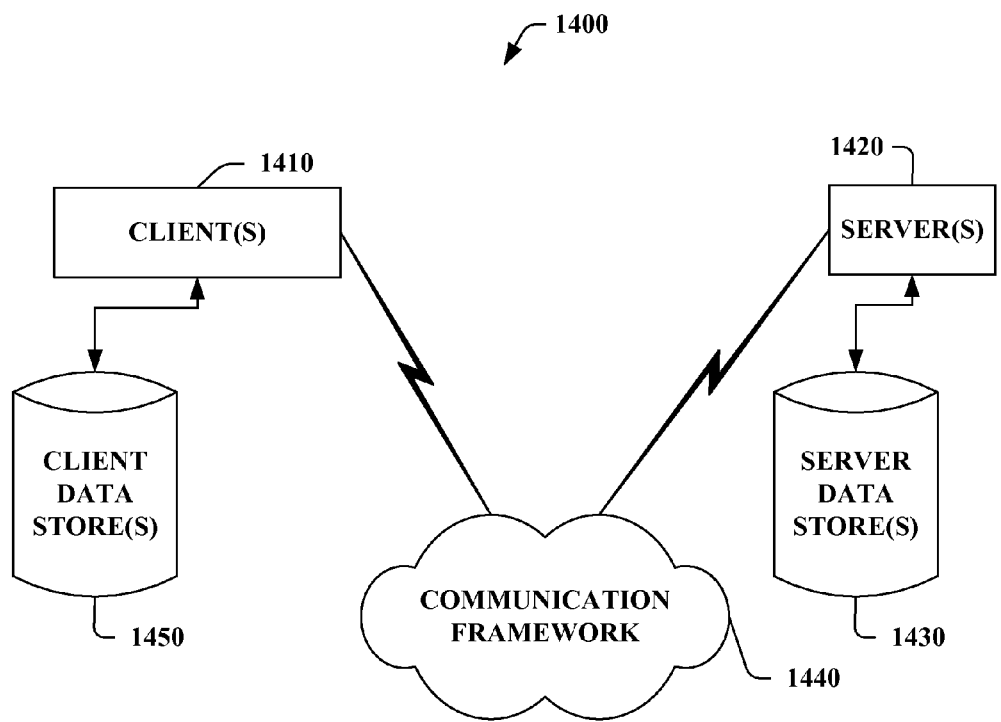
FIG. 14 illustrates an exemplary networking environment, wherein the novel aspects of the claimed subject matter can be employed.
Figure 15:
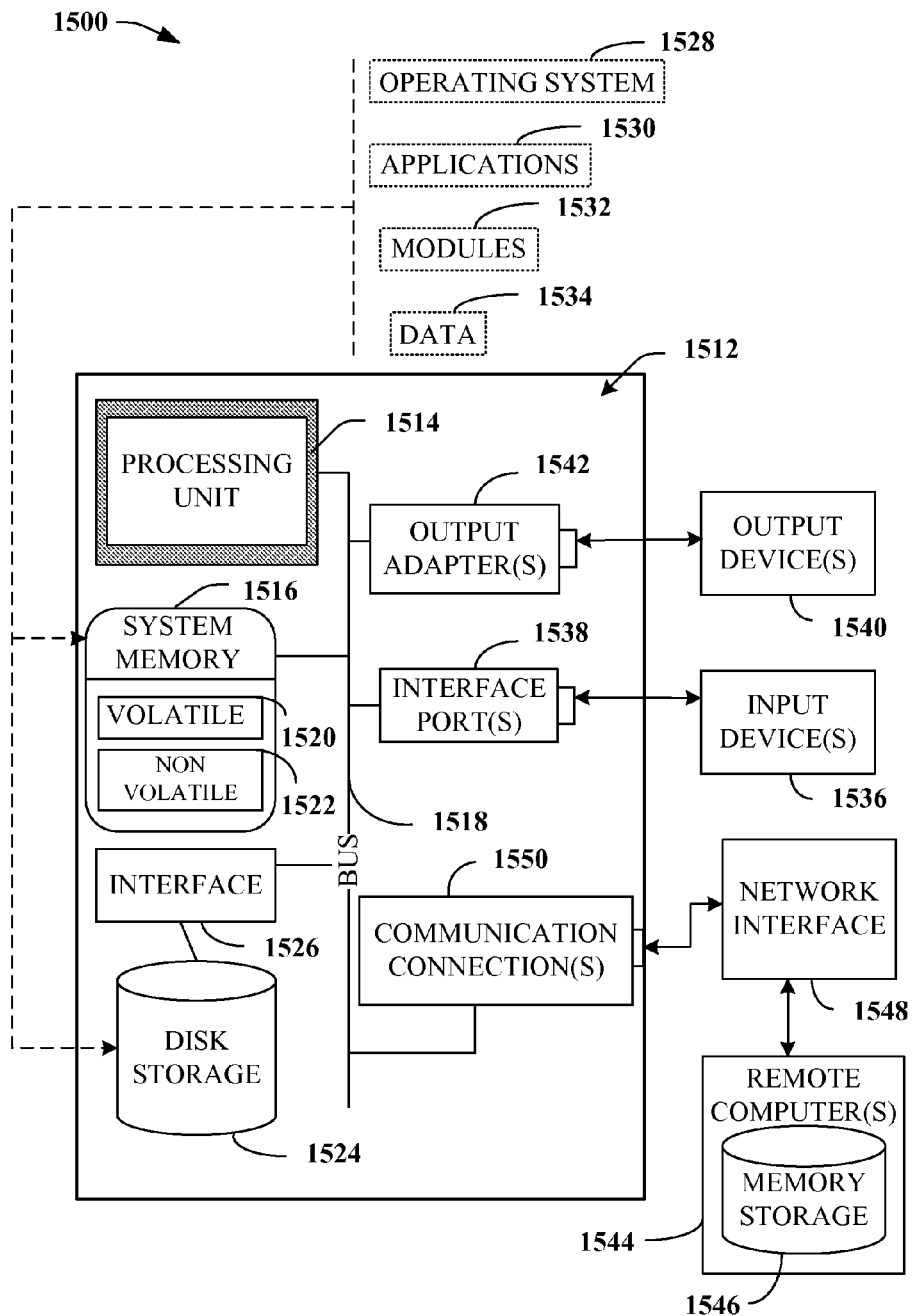
FIG. 15 illustrates an exemplary operating environment that can be employed in accordance with the claimed subject matter.

In order to provide additional context for implementing various aspects of the claimed subject matter, FIGS. 14-15 and the following discussion is intended to provide a brief, general description of a suitable computing environment in which the various aspects of the subject innovation may be implemented. For example, a standardized print component that can employ a universal adapter for various RFID print devices to allow uniform print features/functionality regardless of characteristics, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 14 is a schematic block diagram of a sample-computing environment 1400 with which the claimed subject matter can interact. The system 1400 includes one or more client(s) 1410. The client(s) 1410 can be hardware and/or software (e.g., threads, processes, computing devices). The system 1400 also includes one or more server(s) 1420. The server(s) 1420 can be hardware and/or software (e.g., threads, processes, computing devices). The servers 1420 can house threads to perform transformations by employing the subject innovation, for example.

One possible communication between a client 1410 and a server 1420 can be in the form of a data packet adapted to be transmitted between two or more computer processes. The system 1400 includes a communication framework 1440 that can be employed to facilitate communications between the client(s) 1410 and the server(s) 1420. The client(s) 1410 are operably connected to one or more client data store(s) 1450 that can be employed to store information local to the client(s) 1410. Similarly, the server(s) 1420 are operably connected to one or more server data store(s) 1430 that can be employed to store information local to the servers 1420.

With reference to FIG. 15, an exemplary environment 1500 for implementing various aspects of the claimed subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), or flash memory. Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in the suitable operating environment 1500. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the claimed subject matter can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates utilizing a radio frequency identification (RFID) printer, comprising:
    an RFID network that includes the RFID printer;
    a standardized print component configured to abstract a model-specific implementation of the at least one RFID printer to enable a uniform and standard exposure of a printing feature of the at least one RFID printer independent of a printer model associated with the RFID printer; and
    a search component configured to identify a portion of data related to at least one of the RFID printer or the RFID network.

2. The system of claim 1, wherein the model-specific implementation is an object model configured to describe a particular portion of data related to the RFID printer in a standard manner.

3. The system of claim 2, wherein the object model includes a class hierarchy with at least one of the following: a print_template_field; a data_field; an RFID_field; a printable_data_field; a text a barcode_field; a vendor_defined_field; a graphics_field; or a shape_field.

4. The system of claim 1, further comprising at least one of the following:
    a device-specific provider configured to implement an interface for the RFID printer, wherein the device-specific provider provides a particular portion of data specific to the RFID printer to facilitate exposing the RFID printer; and
    an evaluator component configured to identify the portion of data specific to the RFID printer to further facilitate exposing the RFID printer.

5. The system of claim 1, further comprising a model component configured to generate an object model to expose a plurality of print features related to one or more disparate RFID printers, which enables an implementation of the plurality of print features with the one or more disparate RFID printers.

6. The system of claim 1, wherein the RFID printer includes a mechanism to print an RFID label.

7. The system of claim 6, wherein the standardized print component is configured to provide an agnostic print capability for the RFID printer independent of the mechanism to print the RFID label.

8. The system of claim 1, wherein the standardized print component is configured to utilize a standardized print template for the RFID printer.

9. The system of claim 1, wherein the portion of data relates to at least one of the following: a print feature associated with the RFID printer; the RFID printer; a print template; an RFID print job; a status related to an RFID print job; a print label; data related to a print label; a prior print job; data related to a prior print job; data related to a prior print label; or user data related to manipulation of a print job.

10. The system of claim 1, wherein the RFID printer is at least one of a device within the RFID network, a printer, an RFID print device, or a device with a print function, a user utilizes the model-specific implementation to provide the print feature.

11. The system of claim 1, wherein the standardized print component is configured to provide at least one of the following in a universal manner to the RFID printer: a print template load; a removal of a print template; a retrieval of print template content; a print template name retrieval; a content retrieval of a template; a name set for a print template; a retrieval of a standardized print template; or a print label.

12. The system of claim 1, wherein the standardized print component is configured to provide at least one of the following in a universal manner to the RFID printer: a retrieval of a template image; or a retrieval of a print preview for a print label.

13. The system of claim 1, wherein the standardized print component is configured to enable a parameter for a print job to be supplied universally.

14. The system of claim 13, wherein the parameter is at least one of a value for an RFID field, a tag identification (ID), tag data, a value for a variable text field, a value for a variable bar code, a number of labels to print, an increment specification for a label, a variable barcode field, a variable image field, a variable RFID field, a constant text field, a constant bar code, a constant RFID field, a box, a line, a circle, an ellipse, a shape, a corner, a constant image, a vertical duplication, or a horizontal duplication.

15. The system of claim 1, wherein the RFID network comprises a collection of devices that form a sub-system which includes:
   an RFID reader configured to receive an RFID signal; and
   an RFID tag configured to transmit to at least one device.

16. A computer-implemented method that facilitates printing data within a radio frequency identification (RFID) network, comprising:
   evaluating an RFID printer associated with the RFID network;
   creating an object model that describes a portion of data related to the RFID printer;
   exposing a print feature corresponding to the RFID printer in a standard manner with the object model; and
   utilizing a print template with the object model to create a print label.

17. The method of claim 16, wherein the object model includes a class hierarchy with at least one of the following: a print_template_field; a data_field; an RFID_field; a printable_data_field; a text a barcode_field; a vendor_defined_field; a graphics_field; or a shape_field.

18. A computer-implemented system configured to facilitate utilizing a printer within a radio frequency identification (RFID) network, comprising:
   means for identifying configured to identify an RFID printer within the RFID network;
   means for abstracting configured to abstract a model-specific implementation of the RFID printer;
   means for evaluating configured to identify a portion of data specific to the RFID printer to facilitate exposing the RFID printer; and
   means for enabling configured to enable a uniform and standard exposure of a printing feature of the RFID printer independent of an RFID printer model.

* * * * *